(12) United States Patent
Fujii et al.

(10) Patent No.: US 6,595,015 B2
(45) Date of Patent: Jul. 22, 2003

(54) AIR CONDITIONING SYSTEMS

(75) Inventors: Toshiro Fujii, Kariya (JP); Naoya Yokomachi, Kariya (JP); Takanori Okabe, Kariya (JP); Tatsuya Koide, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 10/055,768

(22) Filed: Jan. 23, 2002

(65) Prior Publication Data

US 2002/0069657 A1 Jun. 13, 2002

Related U.S. Application Data

(62) Division of application No. 09/448,350, filed on Nov. 23, 1999, now Pat. No. 6,374,625.

(30) Foreign Application Priority Data

Nov. 24, 1998 (JP) .......................................... 10-333186

(51) Int. Cl.[7] .............................. F25B 1/00; F25B 49/00
(52) U.S. Cl. .................................. 62/228.3; 417/222.2
(58) Field of Search ........................ 62/228.3, 228.5; 417/222.2

(56) References Cited

U.S. PATENT DOCUMENTS

| | | | |
|---|---|---|---|
| 4,487,031 A | 12/1984 | Rogers et al. ................ 62/160 |
| 4,723,891 A | 2/1988 | Takenaka et al. ............ 417/222 |
| 4,934,157 A | 6/1990 | Suzuki et al. ............... 62/228.5 |
| 5,022,234 A | 6/1991 | Goubeaux et al. .......... 62/228.5 |
| 5,282,329 A | 2/1994 | Teranishi ................ 137/596.17 |
| 5,291,941 A | 3/1994 | Enomoto et al. ............. 165/62 |
| 6,250,094 B1 * | 6/2001 | Ban et al. .................. 62/228.3 |
| 6,293,117 B1 * | 9/2001 | Ban et al. .................. 62/228.3 |
| 6,374,625 B1 * | 4/2002 | Fujii et al. |

FOREIGN PATENT DOCUMENTS

| | | |
|---|---|---|
| EP | 0 894 651 A | 2/1999 |
| EP | 0 980 976 A | 2/2000 |
| JP | 04 043873 A | 2/1992 |
| JP | 04 321779 A | 11/1992 |
| JP | 06 200875 A | 7/1994 |
| JP | 07 019630 A | 1/1995 |
| JP | 08 021365 A | 1/1996 |

* cited by examiner

*Primary Examiner*—William Wayner
(74) *Attorney, Agent, or Firm*—Woodcock Washburn LLP

(57) ABSTRACT

The air conditioning system 100 may include a compressor 101, a heating circuit 152, and a capacity controller 181. The compressor 101 has a suction port 116, a discharge port 120, a driving unit 130 provided within a driving chamber 110, a first passage 201 and a second passage 105. The driving unit 130 may decrease compressor output discharge capacity when the pressure within the driving chamber 110 increases. The first passage 201 may connect the discharge port 120 to the driving chamber 110 and the second passage 105 may connect the driving chamber 110 to the suction port 116. The capacity controller 181 may open the first passage 201 when the refrigerant discharge pressure results predetermined pressure. By opening the first passage 201, the high-pressure refrigerant may be released from the discharge port 120 to the driving chamber 110 through the first passage 201. Thus, the pressure within the driving chamber 110 may increase, the compressor output discharge capacity can be reduced, the abnormally high discharge pressure of the compressor 101 can be alleviated by the reduction in the compressor output discharge capacity.

13 Claims, 5 Drawing Sheets

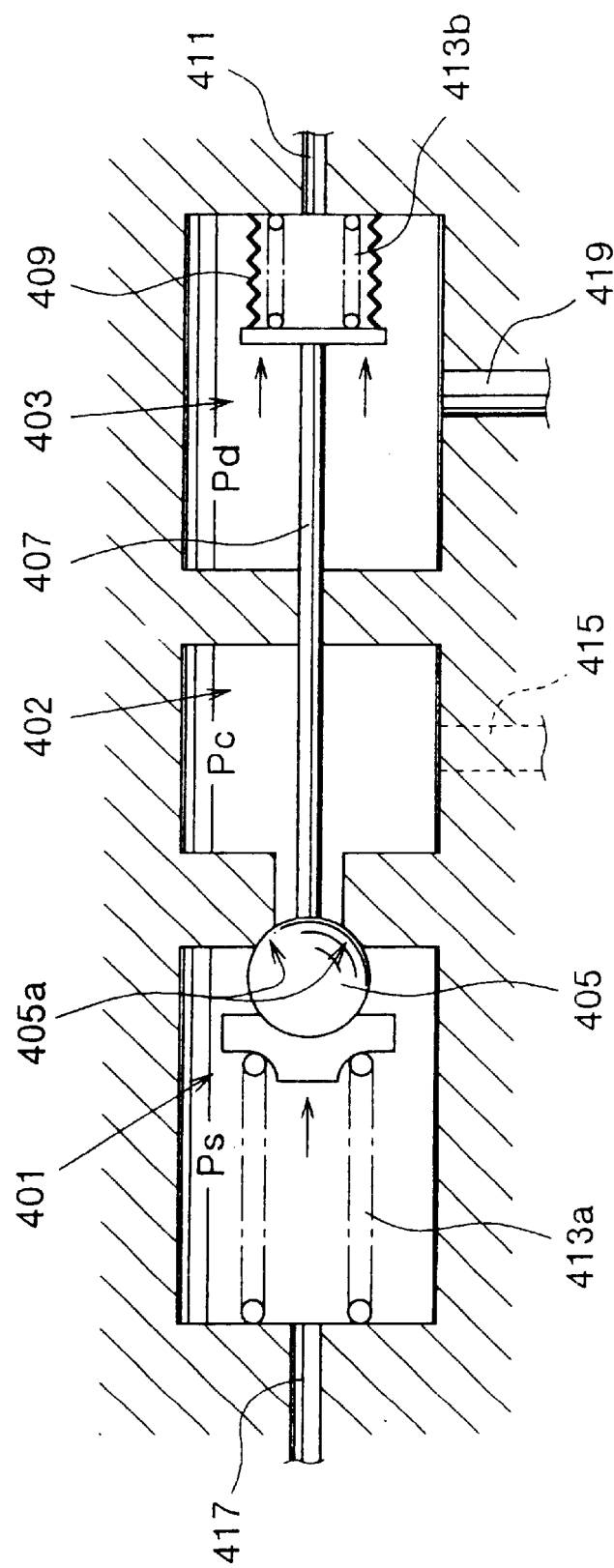

AIR CONDITIONING SYSTEMS

This Application is a divisional of U.S. provisional application Ser. No. 09/448,350 filed Nov. 23, 1999, now U.S. Pat. No. 6,374,625.

BACKGROUND OF THE INVENTION

1. Technical Field

The present invention relates to air conditioning systems that utilize refrigerants and a compressor, and particularly to air conditioning systems capable of effectively alleviating excessive increases in refrigerant discharge pressure within a heating circuit.

2. Description of the Related Art

A known air conditioning system is disclosed in Japanese Patent Application No. 7-19630 and includes a compressor 1, a cooling circuit 51, a heating circuit 52 and a controller 83, as shown in FIG. 1.

The cooling circuit 51 includes a condenser 55, a first expansion valve 57, and a heat exchanger 59 provided on a passage connecting a discharge port D to a suction port S of the compressor 1. High-pressure refrigerant discharged from the discharge port of the compressor 1 is drawn through the above respective devices and back to the compressor 1.

The heating circuit 52 includes a bypass passage 52a that extends from the discharge port D of the compressor 1 to the heat exchanger 59. A second expansion valve 63 is provided within the bypass passage 52a between the discharge port D and the heat exchanger 59. The high pressure refrigerant discharged from the compressor 1 is not directed to the condenser 55, but rather is drawn by the compressor 1 through the second expansion valve 63 and the heat exchanger 59 and this cycle is repeated. Such a heating circuit 52 is generally known as a hot-gas bypass heater.

The operation of the cooling circuit 51 and the heating circuit 52 is changeably selected by opening and closing selector valves 53a and 53b, which opening and closing operations are performed by the controller 83.

Because the air conditioning system is used in a state in which the refrigerant discharge pressure is higher when the heating circuit 52 is used than when the cooling circuit 51 is used, abnormally high pressure is likely to be applied during operation of the heating circuit 52. For example, the abnormally high-pressure state is likely to occur when a rotation speed of the compressor 1 is increased temporarily during operation of the heating circuit 52. Therefore, the air conditioning system is further provided with a refrigerant releasing passage 91 having a pressure relief valve 93. The refrigerant releasing passage 91 is connected to the heating circuit 52 and the cooling circuit 51 and the pressure relief valve 93 can be opened to release the refrigerant from the heating circuit 52 to the cooling circuit 51 when the refrigerant discharge pressure abnormally increases during the operation of the heating circuit 52.

Because the cooling circuit 51 and the heating circuit 52 are alternatively selected by the selector valves 53a and 53b, the refrigerant is released toward the cooling circuit 51 which is not used when the discharge pressure is increased abnormally during operation of the heating circuit 52, thereby preventing the discharge pressure at the heating circuit 52 from increasing abnormally.

Because the refrigerant is released from the operating heating circuit 52 to the cooling circuit 51 which is not used, the abnormally high-pressure state of the discharge pressure during operation of the heating circuit 52 can be alleviated.

However, because the refrigerant in the heating circuit 52 is released into the cooling circuit 51 whenever the discharge pressure increases, the amount of the refrigerant in the heating circuit 52 is reduced and heating performance may be reduced. Moreover, because the high-pressure refrigerant is wastefully released from the heating circuit by working the compressor 1, energy efficiency is reduced.

SUMMARY OF THE INVENTION

It is, therefore, an object of the present invention to provide an air conditioning system that can effectively alleviate abnormally high pressure state.

Preferably, the air conditioning system may include a compressor, a heating circuit, and a capacity controller. The compressor has a suction port, a discharge port, a driving unit provided within a compressor driving chamber, a first passage and a second passage. The driving unit may decrease compressor output discharge capacity when the pressure within the driving chamber increases. The first passage may connect the discharge port to the driving chamber and the second passage may connect the driving chamber to the suction port. The capacity controller may open the first passage when the refrigerant discharge pressure reaches or exceeds a high set point pressure, that is, a predetermined pressure. By opening the first passage, the high-pressure refrigerant may be released from the discharge port to the driving chamber through the first passage. Thus, the pressure within the driving chamber may increase. By increasing the pressure within the driving chamber, the compressor output discharge capacity can be reduced. As the result, the discharge pressure of the compressor will be reduced by the reduction in the compressor output discharge capacity.

In particular, the air conditioning system can solve a problem of insufficient heating performance due to release of the refrigerant within the heating circuit into the cooling circuit for alleviating the abnormally high-pressure state of the discharge pressure during operation of the heating circuit. Moreover, the air conditioner can solve a problem of low energy efficiency due to wasteful release of the high-pressure refrigerant from the heating circuit to the outside.

As another example, the air conditioning system may preferably include a capacity controller that can close the second passage, when the refrigerant discharge pressure reaches or exceeds a high set point pressure, that is, a predetermined pressure. In this example, the high-pressure refrigerant may be released at all times from the discharge port to the driving chamber through the first passage. The refrigerant within the driving chamber may be released into the suction port through the second passage in a normal operation of the air conditioning system. By releasing the refrigerant from the driving chamber into the suction port, pressure within the driving chamber can not increase in a normal operation. To the contrary, the capacity controller can close the second passage when the discharge pressure reaches or exceeds a high set point pressure, that is, a predetermined pressure. By closing the second passage, refrigerant can not be released from the driving chamber into the suction port through the second passage. Thus, the pressure within the driving chamber may increase. By increasing the pressure within the driving chamber, the compressor discharge capacity can be reduced. As the result, the discharge pressure of the compressor can be reduced by the reduction in the compressor output discharge capacity.

Other objects, features and advantages of the present invention will be readily understood after reading the following detailed description together with the accompanying drawings and the claims.

BRIEF DESCRIPTION OF THE DRAWINGS

FIG. 5 shows the capacity controller according to the second representative embodiment.

DETAILED DESCRIPTION OF THE INVENTION

Figure 1:
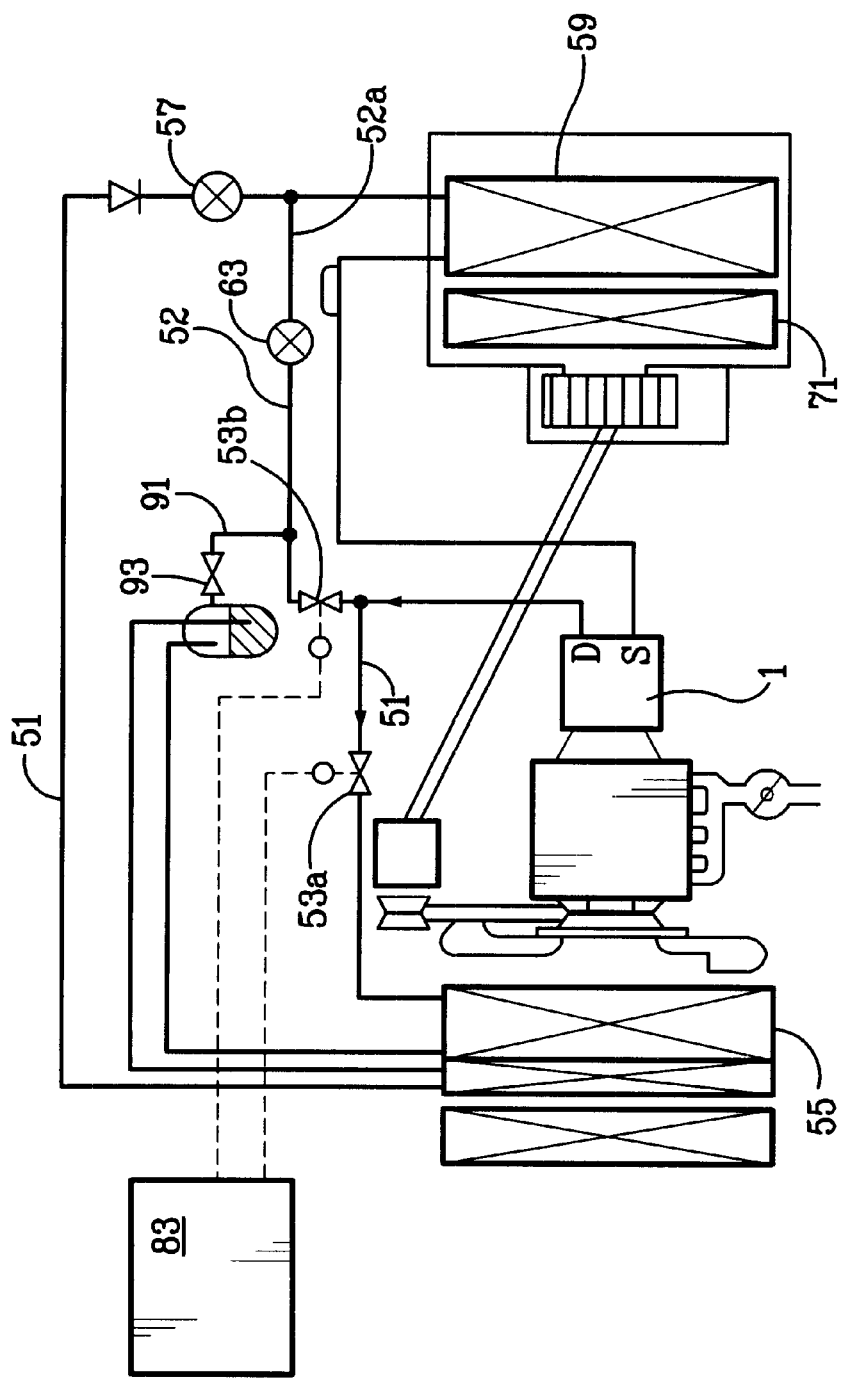
FIG. 1 shows a known air conditioning system.

Preferably, an air conditioning system may include a compressor, a heating circuit, and a capacity controller. The compressor may include a suction port, a discharge port, a driving unit, a first passage and a second passage. The suction port may draw the refrigerant into the compressor. The discharge port may discharge compressed high-pressure refrigerant. The driving unit may be provided within a compressor driving chamber. The driving unit may decrease compressor output discharge capacity when the pressure within the driving chamber increases. The first passage may connect the discharge port to the driving chamber. The second passage may connect the driving chamber to the suction port.

The heating circuit may have a passage that extends from the discharge port to the suction port through the heat exchanger. Such type of the heating circuit is generally known as a hot gas bypass heater. Preferably, a decompressor such as an expansion valve may be provided within the passage from the discharge port to the heat exchanger.

The capacity controller may close the first passage when the refrigerant discharge pressure does not reach or exceed a high set point pressure, (a predetermined pressure) i.e., in a normal operation of the air conditioning system. By closing the first passage, the high-pressure can not be released from the discharge port to the driving chamber. Thus, the pressure within the driving chamber does not increase and the compressor output discharge capacity can not be decreased. To the contrary, the capacity controller may open the first passage when the refrigerant discharge pressure reaches or exceeds a high set point pressure, that is, a predetermined pressure. By opening the first passage, the high-pressure refrigerant may be released from the discharge port to the driving chamber through the first passage. Thus, the pressure within the driving chamber may increase. By increasing the pressure within the driving chamber, the compressor discharge capacity can be reduced. As the result, the discharge pressure of the compressor will be reduced by the reduction in the compressor output discharge capacity. Although a slight reduction of energy efficiency is inevitable because the refrigerant is released from the discharge port to the driving chamber, problems such as an extreme reduction in energy efficiency and a reduction in circuit operating performance due to wasteful release of the high-pressure refrigerant from the circuit to the outside will not occur.

The air conditioning system can effectively alleviate the abnormal high discharge pressure of the refrigerant especially during the operation of the heating circuit by decreasing the output discharge capacity of the compressor. In this representative example, the output discharge capacity may be decreased by opening the first passage. Preferably, a throttle may be provided within the second passage to maintain the high-pressure state within the driving chamber such that the driving unit can decrease the output discharge capacity sufficiently.

The capacity controller may include a valve that is disposed within the first passage. The valve may open the first passage when the refrigerant discharge pressure reaches or exceeds a high set point pressure, that is, a predetermined pressure. As the result, the refrigerant is released from the discharge port into the driving chamber through the first passage thereby increasing the pressure within the driving chamber, decreasing the compressor output discharge capacity, and decreasing the refrigerant discharge pressure. In such a case, the valve is, for example, one of the features corresponding to the capacity controller or means for opening the first passage.

In a second representative example, another type of capacity controller may be utilized in the air conditioning system. In this example, the high-pressure refrigerant may be released at all times from the discharge port into the driving chamber through the first passage. The capacity controller may open the second passage when the refrigerant discharge pressure does not result predetermined high-pressure i.e., in a normal operation of the air conditioning system. By opening the second passage, the high-pressure refrigerant released from the discharge port to the driving chamber can not be retained within the driving chamber and released from the driving chamber into the suction port through the second passage. Thus, the pressure within the driving chamber does not increase and the compressor output discharge capacity can not be decreased, thereby maintaining the circuit operating performance. To the contrary, the capacity controller may close the second passage when the refrigerant discharge pressure results predetermined high pressure. By closing the second passage, the high-pressure refrigerant released from the discharge port into the driving chamber through the first passage may be retained within the driving chamber. Thus, the pressure within the driving chamber may increase. By increasing the pressure within the driving chamber, the compressor discharge capacity can be reduced. As the result, the discharge pressure of the compressor is reduced by the reduction in the compressor discharge capacity.

The capacity controller may include a valve that is disposed within the second passage. The valve may close the second passage when the refrigerant discharge pressure reaches or exceeds a high set point pressure, that is, a predetermined pressure. As the result, the refrigerant released from the discharge port into the driving chamber may be retained within the driving chamber, thereby increasing the pressure within the driving chamber, decreasing the compressor output discharge capacity, and decreasing the refrigerant discharge pressure. In such a case, the valve, is for example, one of the features corresponding to the capacity controller or means for closing the second passage.

In the second representative example, the first passage for connecting the discharge port to the driving chamber may preferably be defined by a clearance between a compressor cylinder bore and a compressor piston. In other words, the first passage in the second representative example may preferably include the clearance between the cylinder bore and the piston. Because the cylinder bore and the piston are provided between the discharge port and the driving chamber, the first passage can be easily constructed without forming any specific passage within the compressor. Therefore, the structure of the air conditioning system can be simplified.

Each of the additional features and method steps disclosed above and below may be utilized separately or in conjunction with other features and method steps to provide improved air conditioning systems and methods for designing and using such air conditioning systems. Representative examples of the present invention, which examples utilize many of these additional features and method steps in conjunction, will now be described in detail with reference to the drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly described some representative examples of the invention, which detailed description will now be given with reference to the accompanying drawings.
First Detailed Representative Embodiment Referring to FIG. 2, a representative air conditioning system 100 may include a cooling circuit 151, a heating circuit 152 and a variable displacement compressor 101 as a driving source for both the heating and cooling circuits. A representative capacity controller is shown in FIG. 3, but is not shown in FIG. 2 for the sake of convenience and will be described below in further detail. Such the air conditioning system 100 may be utilized in a vehicle-mounted air conditioning system. In such case, a driving shaft 125 of the compressor 100 may be coupled to and driven by an automobile engine 170.

The cooling circuit 151 may be driven by high-pressure refrigerant, which is compressed by the compressor 101, and may include a condenser 155, a first expansion valve 157, a heat exchanger 159 and an accumulator 161. These devices may be disposed within a path 151a that extends from a discharge port D to a suction port S of the compressor 101. The heat exchanger 159 is also generally known as an evaporator. The heat exchanger 159 may be arranged side by side with a hot-water heater 171, which circulates hot coolant from the engine 170 through a pipe 173.

The heating circuit 152 is driven by high-temperature and high-pressure refrigerant, which is also compressed by the compressor 101, and may include a second expansion valve 163, the heat exchanger 159 and the accumulator 161. These devices may be disposed on a bypass passage 152a for introducing the refrigerant discharged from the discharge port D to the heat exchanger 159. In other words, the heating circuit 152 partially overlaps with the cooling circuit 151. Such a heating circuit 152 is also generally known as a hot-gas bypass heater.

Figure 2:
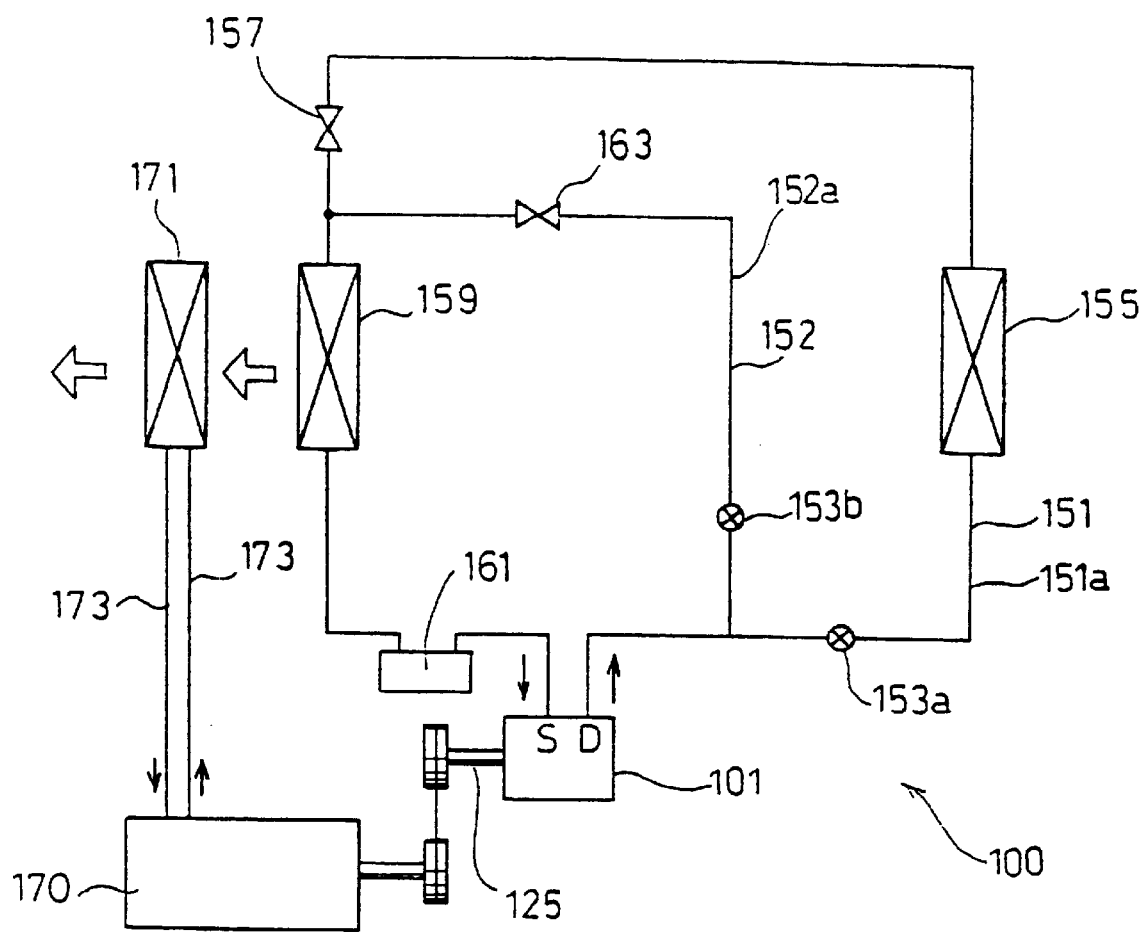
FIG. 2 shows an air conditioning system according to a first representative embodiment.
Figure 3:
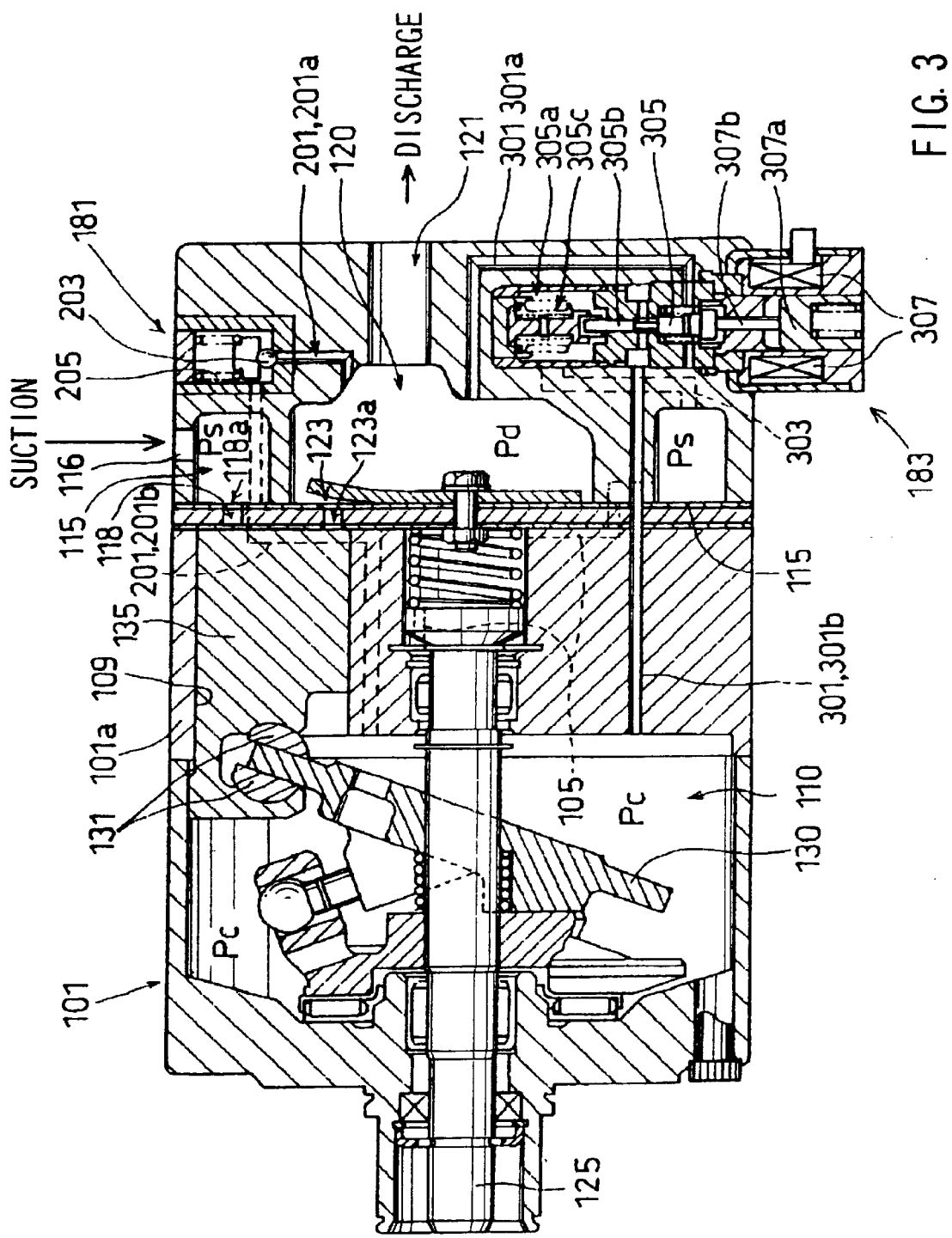
FIG. 3 shows a variable displacement compressor and a capacity controller according to the first representative embodiment.

In FIG. 2, a first open/close valve 153a and a second open/close valve 153b may be utilized as switch valves for alternatively actuating the cooling circuit 151 and the heating circuit 152.

During operation of the cooling circuit 151, the refrigerant is compressed by the compressor 101 to attain a high temperature and high pressure state. The compressed refrigerant is sent to the condenser 155, where heat from the high-temperature refrigerant is dissipated to the outside environment and the refrigerant is liquefied. The refrigerant is decompressed by the first expansion valve 157 and sent to the heat exchanger 159 where the refrigerant absorbs outside heat and is gasified. The gasified refrigerant is returned to the compressor 101 again through the accumulator 161 for re-circulation throughout the system 100.

During operation of the heating circuit 152, the refrigerant is compressed by the compressor 101 to attain a high temperature and high pressure state. The compressed refrigerant is then decompressed by the second expansion valve 163 and sent to the heat exchanger 159, where heat from the compressed refrigerant is dissipated to the outside environment. In the heating circuit cycle, the refrigerant is constantly in a gaseous state while circulating through the heating circuit 152.

The heating circuit 152 may be used as an auxiliary heater. Heat generated by the heat exchanger 159 during operation of the heating circuit 152 may be used as an auxiliary heating source for the hot water heater 171. The heating circuit 152 also may be used to assist the coolant from the engine 170 when the coolant can not provide sufficient heat to start the engine 170 in a low-temperature environment, such as an outside air temperature of −20° C. or so.

Referring to FIG. 3, a representative compressor 101 is shown that may include a driving chamber 110 defined within a housing 101a of the compressor 101 and a swash plate 130 that is rotatably supported by the driving shaft 125 in the driving chamber 110. The swash plate 130 may be supported by the driving shaft 125 and may rotate together with the drive shaft 125. The swash plate 130 is inclined with respect to the driving shaft 125 when the driving shaft 125 rotates and the inclination angle of the swash plate 130 with respect to a plane perpendicular to the axis of rotation of the driving shaft 125 is changeable.

The peripheral edge portion of the swash plate 130 may be connected to the head portions of the pistons 135 by means of movable shoes 131. Six pistons 135 in total may be disposed around the driving shaft 125 (however, only one piston is shown in FIG. 3 for the sake of convenience) and may be laterally slide within six cylinder bores 109. The circumferential positions of the six cylinder bores 109 are fixed by the compressor housing 101a.

When the swash plate 130 rotates together with the driving shaft 125 while being inclined as shown in FIG. 3, the peripheral edge of the swash plate 130 slides with respect to the piston 135 fixed in the circumferential direction. When the peripheral edge of the swash plate 130 is inclined to a position closest to the cylinder bores 109 (as shown in FIG. 3), the piston 135 reaches its deepest insertion into the cylinder bores 109. When the peripheral edge of the swash plate 130 (the peripheral edge shown in a lower part of FIG. 3) is inclined to a position furthest away from the cylinder bores 109 (i.e., when the driving shaft 125 rotates 180° from the state shown in FIG. 3), the piston 135 is substantially withdrawn from the cylinder bore 109. Each 360° rotation of the driving shaft 125 results in each piston 135 laterally reciprocating one time.

A suction port 118a and a discharge port 123a are defined in a bottom portion of each the cylinder bore 109. A suction valve 118 is positioned to correspond to the suction port 118a and a discharge valve 123 is positioned to correspond to the discharge port 123a. Each suction port 118a communicates with a suction chamber 115 and each the discharge port 123a communicates with a discharge chamber 120.

When the piston 135 moves to the left in FIG. 3, as a result of rotation of the swash plate 130, refrigerant is introduced from the suction opening 116 through the suction chamber 115, suction port 118a and suction valve 118 into the cylinder bore 109. When the piston 135 moves to the right in FIG. 3, as a result of further rotation of the swash plate 130, the refrigerant is compressed into a high-pressure state and discharged from a discharge opening 121 through the discharge port 123a, discharge valve 123 and discharge chamber 120.

The output discharge capacity of the compressor 101 is determined by the stroke length of the piston 135, which is determined by the degree of change in inclination angle of the swash plate 130 during each cycle. That is, the further the swash plate 130 is withdrawn from the cylinder bore 109 during each cycle, the longer the stroke length of the piston 135 will be. As the stroke length decreases, the output discharge capacity of the compressor 101 also decreases.

The inclination angle of the swash plate 130 is determined, in part, by the difference in pressure on the opposite sides of the piston 135, i.e., the pressure difference between driving chamber pressure and the cylinder bore pressure. Increasing or decreasing the driving chamber pressure can adjust this pressure difference. When the pressure within the driving chamber 110 is increased, the swash plate 130 does not move as much in the lateral direction and the stroke length of the piston 135 decreases. Therefore, the output discharge capacity also will decrease. When the output discharge capacity decreases, the refrigerant discharge pressure decreases and the suction pressure increases. When the pressure within the driving chamber 110 is decreased, the swash plate 130 will move further in the lateral direction, the stroke length of the piston 135 increases. In this case, the output discharge capacity will increase. When the output discharge capacity increases, the refrigerant discharge pressure increases and the suction pressure decreases.

In order to decrease the output discharge capacity, the high-pressure refrigerant in the discharge chamber 120 is released into the driving chamber 110 to increase the pressure within the driving chamber 110. In order to increase the output discharge capacity instead, the refrigerant in the discharge chamber 120 is prevented from being released into the driving chamber 110.

Such control of changing the output discharge capacity by releasing or not releasing the refrigerant from the discharge chamber to the driving chamber is defined as "releasing-sided control".

In the representative compressor 101, as shown in FIG. 3, the discharge chamber 120 and the driving chamber 110 are connected by a heating circuit capacity control passage 201 and also by a cooling circuit capacity control passage 301. A heating circuit capacity control valve 181 is provided within the heating circuit capacity control passage 201.

The driving chamber 110 is connected to the suction chamber 115 by a bleeding passage 105. A throttle (not particularly shown in the drawings) is provided onto the bleeding passage 105.

The discharge chamber 120 is connected to the heating circuit capacity control valve 181 by a first heating circuit capacity control passage 201a. Therefore, pressure in the first heating circuit capacity control passage 201a is equal to the discharge pressure Pd. The heating circuit capacity control valve 181 is connected to the driving chamber 110 by a second heating circuit capacity control passage 201b. Therefore, the pressure in the second heating circuit capacity control passage 201b is equal to the pressure Pc within the driving chamber.

In the heating circuit capacity control valve 181 as shown in FIG. 3, a valve body 203 is biased to close the heating circuit capacity control passage 201 by utilizing a spring 205. Thus, the first heating circuit capacity control passage 201a and the second heating circuit capacity control passage 201b are not connected in a normal operation of the heating circuit.

When the discharge pressure of the refrigerant reaches a high-pressure state, a difference between the discharge pressure Pd in the first heating circuit capacity control passage 201a and the pressure Pc in the second heating circuit capacity control passage 201b may increase. Such high pressure of the refrigerant may prevail over the biasing force of the spring 205. Thus, the valve body 203 moves to open the heating circuit capacity control valve 181. A condition for opening the heating circuit capacity control valve 181 can be determined by properly adjusting the biasing force of the spring 205. In the first embodiment, the biasing force of the spring 205 is adjusted to open the heating circuit capacity control valve 181 when the discharge pressure Pd reaches a predetermined high-pressure state during operation of the heating circuit.

As shown in FIG. 3, the discharge chamber 120 is connected to the driving chamber 110 by the cooling circuit capacity control passage 301. A cooling circuit capacity control valve 183 is provided within the cooling circuit capacity control passage 301. The discharge chamber 120 is connected to the cooling circuit capacity control valve 183 by a first cooling circuit capacity control passage 301a. Therefore, pressure in the first cooling circuit capacity control passage 301a is equal to the discharge pressure Pd. The cooling circuit capacity control valve 183 is connected to the driving chamber 110 by a second cooling circuit capacity control passage 301b. Therefore, pressure in the second cooling circuit capacity control passage 301b is equal to the pressure Pc in the driving chamber 110.

The cooling circuit capacity control valve 183 includes a valve body 305, an actuating member 307a actuated by a solenoid 307, a connecting member 307b for connecting the actuating member 307a to the valve body 305 and a bellows 305a. The bellows 305a can expand and contract to move the valve body 305 in accordance with the suction pressure Ps. The suction pressure Ps for expanding or contracting the bellows 305a may be detected through a suction pressure detecting passage 303 that is connected to the suction chamber 115. The bellows 305a opens the valve body 305 to communicate the first cooling circuit capacity control passage 301a with the second cooling circuit capacity control passage 301b when the suction pressure Ps meets the condition of opening the valve body 305. Such condition may be changed by exciting or not exciting the solenoid 307. A controller (not particularly shown in the drawings) generates a control signal for exciting or not exciting the solenoid 307. This is because the force exerted onto the actuating member 307a by the solenoid 309 is utilized as a biasing force against the movement of the bellows 305a. During operation of the heating circuit, the solenoid 307 is excited to close the cooling circuit capacity control valve 183, because the output discharge capacity is to be controlled exclusively by utilizing the heating circuit capacity control valve 181 during operation of the heating circuit.

When the discharge pressure Pd of the refrigerant reaches or exceeds a high set point pressure, that is, a predetermined pressure during operation of the heating circuit 152, the difference between the discharge pressure Pd and the pressure Pc within the driving chamber 110 increases and the valve body 203 of the heating circuit capacity control valve 181 is moved to communicate the first heating circuit capacity control passage 201a with the second heating circuit capacity control passage 201b. The refrigerant is released from the discharge chamber 120 into the driving chamber 110 through the heating capacity control passage 201. The pressure Pc within the driving chamber 110 increases. Thus, the swash plate 130 stands (i.e., the inclination angle of the swash plate 130 decreases), the stroke length of the piston 135 decreases, the output discharge capacity of the compressor 101 decreases, and the discharge pressure Pd decreases. As the result, the abnormally high-pressure state during the operation of the heating circuit can be alleviated. The amount of the refrigerant necessary for decreasing the output discharge capacity is relatively small. Therefore, extreme reduction of the energy efficiency does not occur.

To the contrary, in the normal operation of the heating circuit, i.e., when the discharge pressure is not in the predetermined high-pressure state during the operation of the heating circuit, the heating circuit capacity control valve 181 is closed, because the discharge pressure Pd does not prevail over the biasing force of the spring 205. Therefore, the heating circuit capacity control passage 201 is closed and the refrigerant is not released form the discharge chamber 120 into the driving chamber 110.

Because the throttle is provided within the bleeding passage 105, the refrigerant released from the discharge chamber 120 into the driving chamber 110 may be retained in the driving chamber 110 thereby maintaining the high-pressure state within the driving chamber 110 for sufficiently decreasing the compressor output discharge capacity.

When the suction pressure Ps results predetermined low-pressure state during operation of the cooling circuit 151, the bellows 305a of the cooling circuit capacity control valve 183 is expanded by the biasing force of a spring 305c and the valve 305 moves to communicate the first cooling circuit capacity control passage 301a with the second cooling circuit capacity control passage 301b. Thus, the refrigerant is released from the discharge chamber 120 into the driving chamber 110 through the cooling circuit capacity control passage 301. Thus, the pressure within the driving chamber 110 increases and the compressor output discharge capacity decreases. By decreasing the output discharge capacity of the compressor 101, the suction pressure Ps increases and the heat exchanger 159 (shown in FIG. 2) is prevented from being frosted.

During operation of the heating circuit, the cooling circuit capacity control valve 183 is necessarily to be closed because the discharge pressure is controlled exclusively by the heating circuit capacity control valve 181. Therefore, when the heating circuit is operated, the solenoid 307 is not excited. Thus, the cooling circuit capacity control passage 301 is closed during the operation of the heating circuit.

To the contrary, during operation of the cooling circuit, the heating circuit capacity control valve 181 is necessarily to be closed because the suction pressure is controlled exclusively by utilizing the cooling circuit capacity control valve 183. However, the heating circuit capacity control valve 181 utilizes the difference between the discharge pressure Pd and the pressure within the driving chamber 110. Therefore, during operation of the cooling circuit, the heating circuit capacity control valve 181 may possibly be opened when the discharge pressure Pd particularly increases with respect to the pressure within the driving chamber 110. However, the pressure necessary for opening the heating circuit capacity control valve 181 is set to be higher than the discharge pressure for operating the cooling circuit. Therefore, the heating circuit capacity control valve 181 is unlikely opened during operation of the cooling circuit. Moreover, even if the heating circuit capacity control valve 181 is opened during the operation of the cooling circuit, the compressor output discharge capacity decreases and the discharge pressure decreases. Therefore, the heating circuit capacity control valve 181 can swiftly be closed causing no practical damage onto the air conditioning system.

In such air conditioning system having a hot-gas bypass heater, reductions in heating performance due to the release of refrigerant from the heating circuit into the cooling circuit to alleviate an abnormally high-pressure state does not occur. Also, energy efficiency is not significantly decreased due to wasteful releasing of the refrigerant at highly increased pressure to outside the heating circuit.

Moreover, in the representative air conditioning system, the refrigerant is not released from the discharge side to the suction side to decrease the discharge pressure by the direct action of such release. Instead, a small amount of refrigerant is released into the driving chamber to increase the pressure within the driving chamber, decrease the inclination angle of the swash plate, decrease the piston stroke length and decrease the output discharge capacity, thereby decreasing the discharge pressure. With this structure, wasted system energy required to alleviate the abnormally high-pressure state of the discharge pressure is reduced to a minimum.

As shown in FIG. 3, although the driving chamber 110 is connected to the suction chamber 115 through the bleeding passage 105, the refrigerant released from the discharge chamber 120 builds up temporality in the driving chamber 110 and is not released directly into the suction chamber 120. Therefore, the suction pressure Ps is prevented from increasing by being directly affected by release of the high-pressure refrigerant. As a result, the decreasing effect of the discharge pressure Pd can be maintained for a relatively long time. In this sense, release of the refrigerant into the driving chamber 110 in the embodiment has significance in substantially using the driving chamber 110 as a reserve tank.

In the first embodiment, although the heating circuit capacity control valve 181 utilizes the difference between the discharge pressure Pd and the pressure within the driving chamber 110, the heating circuit capacity control valve 181 may be opened by utilizing another difference in pressure. For example, suction pressure may preferably be utilized instead of the pressure within the driving chamber. Also, a solenoid valve that is opened or closed by the controller like the cooling circuit capacity control valve 183 may preferably be utilized to the heating circuit capacity control valve.

Second Detailed Representative Embodiment

Figure 4:
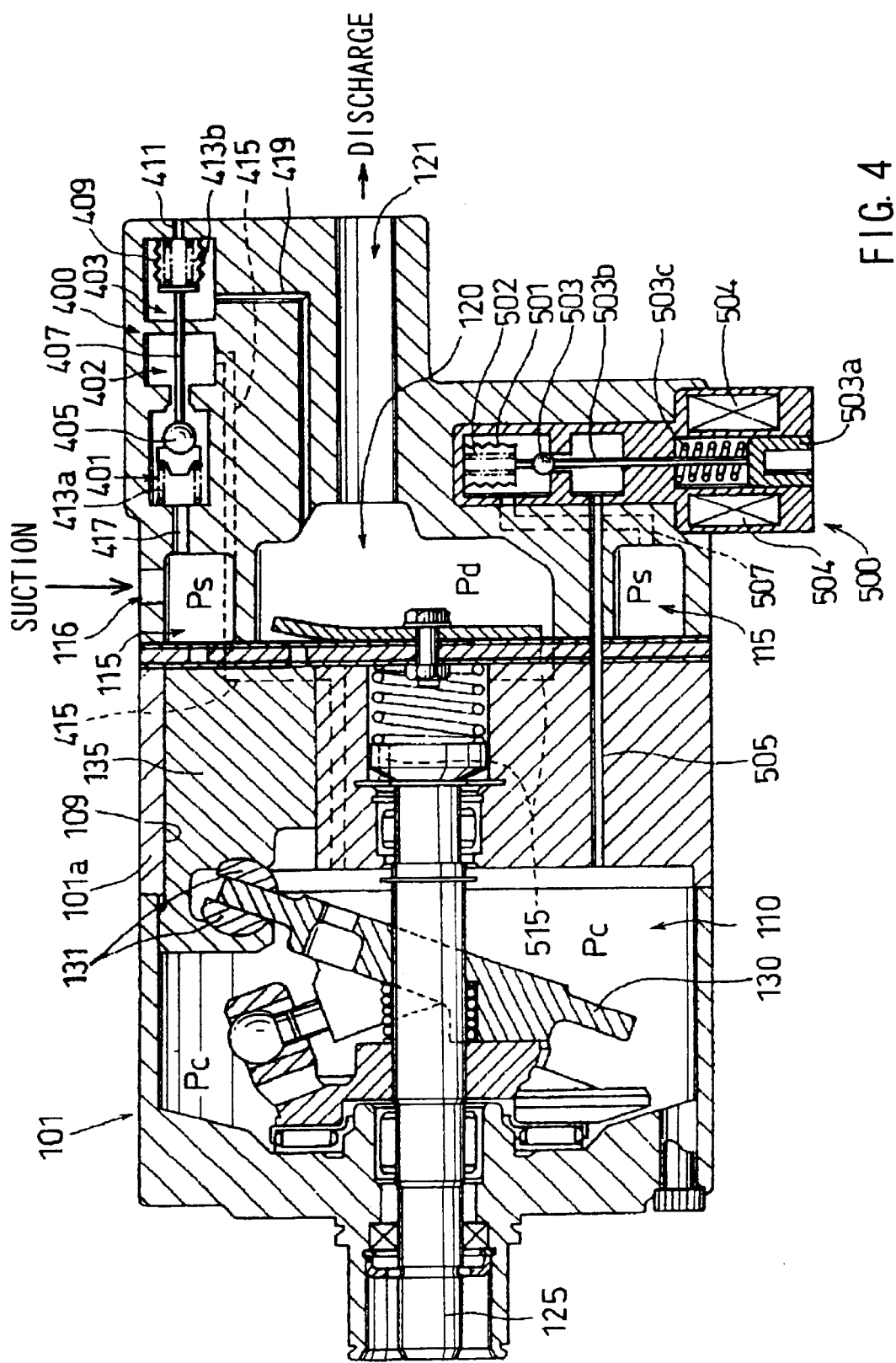
FIG. 4 shows a variable displacement compressor and a capacity controller according to a second representative embodiment.

A second detailed representative embodiment is shown in FIG. 4 and includes a different type of capacity control structure from the first representative embodiment.

The discharge chamber 120 is connected to the driving chamber 110 by a refrigerant release passage 515. A throttle is provided within the refrigerant release passage 515 although it is not particularly shown in FIG. 4.

The driving chamber 110 is connected to the suction port 115 through a first heating circuit refrigerant bleeding passage 415 and a second heating circuit refrigerant bleeding passage 417. A heating circuit capacity control valve 400 is provided between the both first and second heating circuit bleeding passage 415, 417.

Moreover, the driving chamber 110 is also connected to the suction port 115 through a first cooling circuit refrigerant bleeding passage 505 and a second cooling circuit refrigerant bleeding passage 507. A cooling circuit capacity control valve 500 is provided between the both first and second cooling circuit bleeding passage 505, 507.

In the heating circuit capacity control valve 400, three section chambers are provided. A first section chamber 401 communicates with the suction chamber 115 through the second heating circuit capacity control passage 417. A second section chamber 402 communicates with the driving chamber 110 through the first heating circuit capacity control passage 415. A third section chamber 403 communicates with the discharge chamber 120 through a discharge pressure detecting passage 419. In the first section chamber 401, a valve body 405 disposed. As shown in FIG. 4, the valve body 405 communicates the first section chamber 401 with the second section chamber 402 during the normal operation of the heating circuit. A bellows 409 is provided within the third section chamber 403 and atmospheric pressure is introduced into the bellows 409 through an atmospheric pressure introducing passage 411. The third section chamber 403 communicates with the discharge chamber 120 through the discharge pressure detecting passage 419 but does not communicate with the another section chambers 401, 402. The bellows 409 is connected to the valve body 405 by means of a connecting member 407. The cooling circuit capacity control valve 500 includes a bellows 501, a valve body 503, an actuating member 503a and a solenoid 504. The bellows 501, the valve body 503 and the actuating member 503b are integrally connected by utilizing a connecting bar 503b. The bellows 501 can expand or contract to open or close the valve body 503 in response to the suction pressure Ps. The suction pressure Ps is detected by utilizing the second cooling circuit refrigerant bleeding passage 507. A spring 502 is provided within the bellows 501 for biasing the valve body 503 to be closed. The solenoid 504 is excited or not excited by the solenoid 504 for adjusting the biasing force. When the solenoid 504 is excited, the actuating member 503b moves toward the valve body 503 and the connecting bar 503b pushes the valve body 503 to facilitate opening of the passage. When the valve body 503 closes the passage, the pressure within the driving chamber 110 increases because the high-pressure refrigerant released from the discharge chamber 120 into the driving chamber 110 is retained within the driving chamber 120. The swash plate 130 will not move to increase the compressor output discharge capacity. When the valve body 503 opens the passage instead, the pressure within the driving chamber 110 decreases because the high-pressure refrigerant within the driving chamber 110 is released into the suction chamber 115. Thus, the swash plate 130 moves to increase its inclination angle to a maximum value.

In this embodiment, high-pressure refrigerant in the discharge pressure 120 is released at all times into the driving chamber 110 through the refrigerant release passage 405 during operation of both heating and cooling circuits. The throttle is provided onto the refrigerant release passage 515. Therefore, relatively small amount of the refrigerant is released from the discharge chamber 120 into the driving chamber 110.

During operation of the heating circuit, when the refrigerant discharge pressure Pd is not in the predetermined high-pressure state, the heating circuit capacity control valve 400 is opened. FIG. 4 shows such the state. Therefore, the first heating circuit capacity control passage 415 is communicated with the second heating circuit capacity control passage 417. As the result, the driving chamber 110 is connected to the suction chamber 115. Thus, the high-pressure refrigerant released from the discharge port 120 to the driving chamber 110 is released into the suction chamber 115 through the first heating circuit capacity control passage 415, the heating circuit capacity control valve 400, and the second heating circuit capacity control passage 417. As the result, high-pressure state can not be maintained within the driving chamber 110 and the inclination angle of the swash plate 130 will not decrease. Therefore, output discharge capacity is maintained at high.

To the contrary, when the refrigerant discharge pressure Pd results predetermined high-pressure state during operation of the heating circuit, the heating circuit capacity control valve 400 is closed. FIG. 5 shows such the state. As shown in FIG. 5, when the difference between pressure Pd within the third section chamber 403 and atmospheric pressure within the bellows 409 increases, the bellows 409 contracts against the biasing force of the spring 413b. The valve body 405 integrally connected to the bellows 409 moves to the right in FIG. 5 to contact with the valve seat 405a. As the result, the first heating circuit capacity control passage 415 does not communicate with the second heating circuit capacity control passage 417. The driving chamber 110 does not communicate with the suction chamber 115. Thus, the high-pressure refrigerant within the driving chamber 110 is not released into the suction chamber 115 and the pressure within the driving chamber 110 is increased. As the result, the swash plate 130 shown in FIG. 4 will stand (the inclination angle decreases), the stroke length of the piston 135 decreases and the output discharge capacity decreases. Thus, the discharge pressure Pd decreases and the abnormally high-pressure state of the discharge pressure Pd is alleviated. Such control of changing output discharge capacity by controlling the release of the refrigerant from the driving chamber to the suction chamber for alleviating the high discharge pressure is defined as "bleeding-sided control". During operation of the heating circuit, the cooling circuit capacity control valve 500 is closed at all times such that the above described heating circuit capacity control valve 500 may exclusively control the compressor output discharge capacity in operating the heating circuit.

During operation of the cooling circuit, when the refrigerant suction pressure Ps is not in the predetermined low pressure, the cooling circuit capacity control valve 500 is opened. As the result, the driving chamber 110 communicates with the suction chamber 115. The high-pressure refrigerant released from the discharge chamber 120 to the driving chamber 110 is released from the driving chamber 110 to the suction chamber 115. Thus, the pressure within the driving chamber 110 does not increase, the inclination angle of the swash plate 130 does not increase, the output discharge capacity does not decrease, thereby maintaining high cooling performance.

On the other hand, during operation of the cooling circuit, when the refrigerant suction pressure Ps results predetermined low-pressure state, the cooling circuit capacity control valve 500 is closed. Therefore, the refrigerant within the driving chamber 110 is not released into the suction chamber 115, the pressure within the driving chamber 110 increases, the output discharge capacity decreases and the suction pressure increases, thereby preventing the heat exchanger from being frosted Because the compressor output discharge capacity is to be controlled exclusively by utilizing the cooling circuit capacity control valve 500 during operation of the cooling circuit, the heating circuit capacity control valve 400 is necessarily to be closed. This point is substantially the same as described in the first embodiment.

In the second representative embodiment, although the heating circuit capacity control valve 400 utilizes the difference between the discharge pressure Pd and the atmospheric pressure, the heating circuit capacity control valve 400 may be opened by utilizing another difference in pressure. For example, suction pressure may preferably be utilized instead of the atmospheric pressure, within the driving chamber. Also, a solenoid valve that is opened or closed by the controller like the cooling circuit capacity control valve 500 may preferably be utilized to the heating circuit capacity control valve.

Moreover, because the necessary amount of refrigerant for increasing the pressure within the driving chamber 110 is relatively small, the clearance between the pistons 135 and the cylinder bores 109 may preferably be utilized as the passage for releasing the refrigerant from the discharge chamber 120 into the driving chamber 110 instead of providing the refrigerant release passage 515.

Because other structures, i.e., structures of the cooling circuit and the heating circuit and structures of the swash plate, the pistons, and the like of the compressor are the same as those in the first representative embodiment, such structures are not described in detail.

Although the air conditioning system has the cooling circuit and the heating circuit, the cooling circuit may be omitted because it is mainly during operation of the heating circuit that the measure against the abnormally high discharge pressure is necessary.

Although a one-sided swash plate type of variable displacement compressor, i.e., a variable displacement compressor of a type in which the pistons 135 are disposed only on one side of the swash plate 130 in FIGS. 3 and 4 is used in both of the first and second embodiments, a double-ended piston type of compressor in which pistons are connected to opposite sides of the swash plate for reciprocation can be used.

Although the capacity controller is provided inside the compressor (in the housing) in both of the first and second embodiments, the capacity controller can be provided outside the compressor.

Further, although it is not particularly shown in the drawings, the following features may preferably be employed to any of the representative embodiments.

First, driving chamber decompression means that releases the refrigerant from the driving chamber 110 in FIG. 3 into the suction area (suction chamber 115, suction port 118*a* or suction opening 116) separately from the refrigerant bleeding passage 105 when the driving chamber 110 is brought into a predetermined high-pressure state. The driving chamber decompression means may preferably have a passage extending from the driving chamber 110 to the suction area and a driving chamber decompression valve provided on the passage. The driving chamber decompression valve is opened when the driving chamber is brought into the predetermined high-pressure state in order to release the high-pressure refrigerant from the driving chamber 110 to the suction area to thereby prevent the airtight seal of the driving chamber 110 from being degraded.

Second, means for releasing the refrigerant directly from the discharge area (discharge chamber 120 or discharge opening 121) into the suction area may preferably be provided. The refrigerant releasing means may preferably have a passage extending from the discharge area to the suction area and a refrigerant releasing valve provided on the passage. The refrigerant releasing valve is opened when the discharge pressure is extremely increased such that the normal control by decreasing the compressor discharge capacity can not alleviate the extreme increase in the discharge pressure. Therefore, such means can be utilized as an emergent releasing means for decreasing the abnormal high-pressure state of the refrigerant.

What is claimed is:

1. An air conditioning system comprising:
    a compressor having a suction port, a discharge port, a driving unit provided within a compressor driving chamber, the driving unit decreasing compressor output discharge capacity when pressure within the driving chamber increases, a first passage that connects the discharge port to the driving chamber, a second passage that connects the driving chamber to the suction port;
    a heating circuit having a passage that extends from the discharge port to the suction port through the heat exchanger; and
    a capacity controller that closes the second passage when the refrigerant discharge pressure reaches or exceeds a predetermined set point pressure.

2. An air conditioning system according to claim 1, wherein the capacity controller has a valve disposed within the second passage and the valve closes the second passage when the refrigerant discharge pressure reaches or exceeds the predetermined set point pressure.

3. An air conditioning system according to claim 1, wherein the first passage defined by a clearance between a compressor cylinder bore and a compressor piston.

4. A method of using the air conditioning system according to claim 1, comprising the step of:
    closing the second passage when the refrigerant discharge pressure reaches or exceeds the predetermined set point pressure.

5. A method according to claim 4, wherein the release of the refrigerant from the driving chamber to the suction port is cut when the refrigerant discharge pressure reaches or exceeds the predetermined set point pressure.

6. A method according to claim 5, wherein the release of the refrigerant from the driving chamber to the suction port is cut by closing a valve disposed within the second passage.

7. A method according to claim 4, wherein the discharge port is connected to the driving chamber by utilizing a clearance between a compressor cylinder bore and a compressor piston.

8. A method according to claim 4, wherein the air conditioning system further comprises a cooling circuit having a condenser disposed on a passage extending from the discharge port to the suction port and a heat exchanger disposed downstream from the condenser.

9. An air conditioning system according to claim 1, further comprising:
    a cooling circuit having a condenser disposed on a passage extending from the discharge port to the suction port and a heat exchanger disposed downstream from the condenser.

10. An air conditioning system according to claim 1, wherein the driving unit further comprises:
    a swash plate connected to a driving shaft disposed within the driving chamber, the swash plate rotating together with the driving shaft at an inclination angle with respect to a plane perpendicular to the driving shaft; and
    a piston disposed in a cylinder bore, an end portion of the piston connected to a peripheral edge of the swash plate by means of a shoe, the piston reciprocating in the cylinder bore to compress the refrigerant in response to rotation of the swash plate in the driving chamber.

11. An air conditioning system according to claim 1, wherein the capacity controller is provided within a housing of the compressor.

12. A vehicle comprising an air conditioning system according to claim 1 and an engine for driving the compressor.

13. An air conditioning system comprising:
    a compressor having a suction port, a discharge port, a driving unit provided within a compressor driving chamber, the driving unit decreasing compressor output discharge capacity when pressure within the driving chamber increases, a first passage that connects the discharge port to the driving chamber, a second passage that connects the driving chamber to the suction port, a heating circuit having a passage that extends from the discharge port to the suction port through the heat exchanger, means for closing the second passage when the refrigerant discharge pressure reaches or exceeds a predetermined set point pressure.

* * * * *